W. H. BAUERT.
MEANS FOR CONTRACTING OR EXPANDING SPLIT DEMOUNTABLE RIMS.
APPLICATION FILED JUNE 16, 1920.

1,438,514.  Patented Dec. 12, 1922.

INVENTOR
WILLIAM HENRY BAUERT
BY
ATTORNEY

Patented Dec. 12, 1922.

1,438,514

UNITED STATES PATENT OFFICE.

WILLIAM HENRY BAUERT, OF ROSEVILLE, NEAR SYDNEY, NEW SOUTH WALES, AUSTRALIA.

MEANS FOR CONTRACTING OR EXPANDING SPLIT DEMOUNTABLE RIMS.

Application filed June 16, 1920. Serial No. 389,308.

*To all whom it may concern:*

Be it known that WILLIAM HENRY BAUERT, a subject of the King of Great Britain and Ireland, and residing at Shirley Road, Roseville, near Sydney, New South Wales, Australia, has invented certain new and useful Means for Contracting or Expanding Split Demountable Rims, of which the following is a specification.

This invention relates to means which are usable for contracting split demountable metal rims for vehicle wheels for the purpose of removing therefrom or replacing thereon rubber tyres. Part of such means is also usable for expanding such rims.

Said means comprise a chain to the opposite ends of which are attached a hook adapted to be engaged with the opposite sides of a rim to be contracted; a pair of catch hooks, each of which is loosely but securely hung to said rim hooks; and a lever handle adapted to be engaged with the links of said chain and with said catch hooks when the apparatus is set on a rim and operated to contract it either for removing a tyre therefrom or for replacing a tyre thereon. The lever handle is also usable separately for prizing the split ends of the rim over each other when the rim is to be contracted or for aligning the split ends of the rim when same is to be expanded.

The apparatus is applicable for use with demountable split wheel rims of varying diameter and it may be readily fitted to and detached from such rims.

Figure 1:
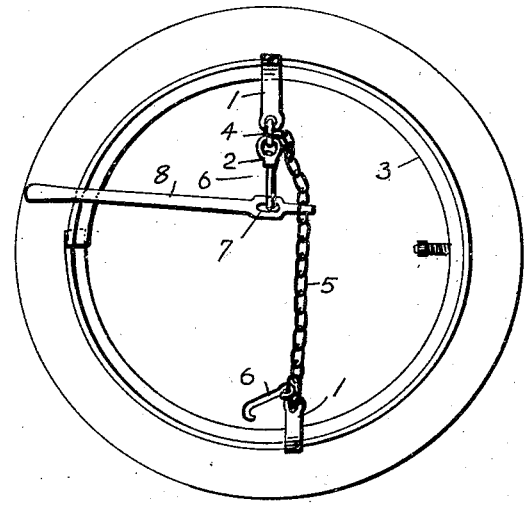
Figure 3:
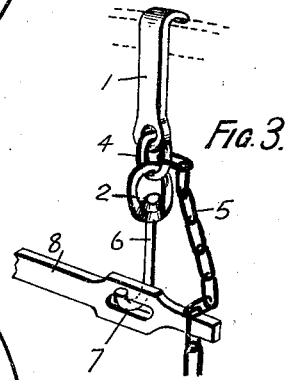
Figure 2:
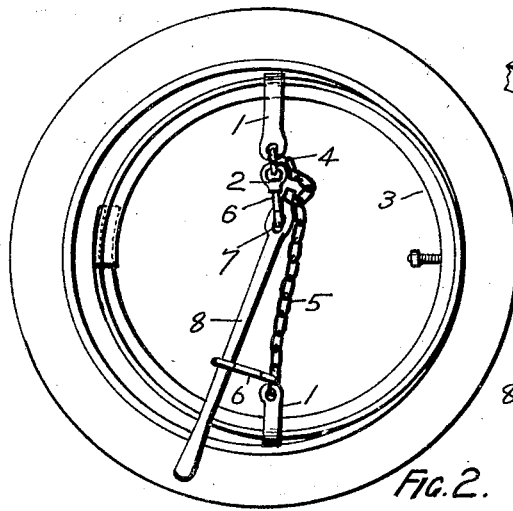
Figure 4:
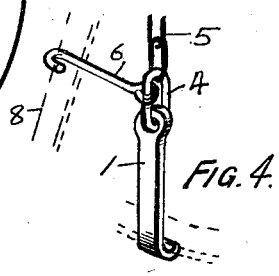

My invention is illustrated in the accompanying drawings, in which Fig. 1 is a side elevation of a split demountable tyre carrying rim with tyre thereon and apparatus according to my invention fitted therein position to enable the rim to be contracted; Fig. 2 is a view corresponding with Fig. 1 showing the rim contracted; Fig. 3 is a detail view showing the chain and rim hook attached to a link coupled to a link pivotally carrying the catch hook; the latter hook being connected to an eye in the lever; and Fig. 4 is a view of the catch hook in engagement with the power end of the lever, such hook being loosely but securely hung to a link affixed to the rim hook.

The rim hooks 1 are adapted to be engaged with opposite sides of the rim 3 which is of channel section; these hooks may be eyed to carry the tie links 4 to each of which the opposite ends of the chain 5 are attached. The catch hooks 6 may be loosely but securely hung at one end to the tie links 4 as shown in Fig. 4 or they may be swivelled to the links 2 which are attached to the links 4 as shown in Fig. 3; or one end of the chain may carry the hooks in the manner shown in Fig. 3 whilst at the other end the chain may have the hooks coupled to it as shown in Fig. 4. A lever 8 having one or more holes 7 at one end is reduced at such end to adapt it for engagement with the links of the chain 5. Such lever is capable of attachment to the bent end of either of the hooks 6 by setting such end through any one of the holes 7 in the lever. Either end of the lever 8 may be bevelled and such end slightly bent to enable the lever to be used as a tool for prizing the split ends of the rim over each other when the trim is to be contracted and for returning such split ends adjacent to each other when the rim is to be expanded.

In Fig. 2 of the drawings the rim is shown contracted, the lever 8 having been moved in an anti-clockwise direction from the position shown in Fig. 1 to that shown in Fig. 2. When it is desired to contract a demountable metal rim one end of it is prized inwardly by the lever handle 8 so that such end will slightly underlie the other split end of the rim; the rim hooks 1 having been secured to the rim and the reduced end of the lever 8 set into one of the links of the chain 5, and either of the hooks 6 attached to the eye 7 in the lever, by moving the lever 8 on the fulcrum formed by the loose end of either of the hooks 6 to which it is attached, tension is applied to the chain 5 and the rim is contracted through the overlapping of its split end portions, and a rubber tyre is then free to be removed from or replaced on it. The rim is held in contracted position by securing the power end of the lever to either of the hooks 6 which is not used as a fulcrum for the lever (see Fig. 4). To expand the rim, tension on the chain is relaxed and the overlapped portions of its split ends are prized into adjacent position with each other by the bevelled end of the lever 8.

What I claim as my invention and desire to secure by Letters Patent is:—

A tool for contracting split demountable tyre rims, comprising a chain provided with a ring at opposite ends thereof, a pair of hooks linked with each of said rings, one hook of each pair adapted to engage diametrically opposite points on said rim, and a lever having an eye adjacent one end to receive the other hook of one of said pairs, said lever having a reduced end portion beyond said eye insertible into the links of the chain and adapted to be moved arcuately towards the opposite end of the chain to be engaged by the unengaged hook of the other pair of hooks to hold the lever substantially parallel to the chain and to shorten the latter and contract the rim.

In testimony whereof I have affixed my signature.

WILLIAM HENRY BAUERT.